Feb. 26, 1957 E. M. ROTHERMEL ET AL 2,782,803
REINFORCED FLEXIBLE CONDUIT
Filed Dec. 14, 1953 2 Sheets-Sheet 1

INVENTOR.
EDWARD M. ROTHERMEL
RUSSELL B. WADDELL, JR.
BY
ATT'Y.

Feb. 26, 1957 E. M. ROTHERMEL ET AL 2,782,803
REINFORCED FLEXIBLE CONDUIT
Filed Dec. 14, 1953 2 Sheets-Sheet 2

INVENTOR.
EDWARD M. ROTHERMEL
RUSSELL B. WADDELL, JR.
BY
ATT'Y.

United States Patent Office 2,782,803
Patented Feb. 26, 1957

2,782,803

REINFORCED FLEXIBLE CONDUIT

Edward M. Rothermel and Russell B. Waddell, Jr., Waynesville, N. C., assignors to The Dayton Rubber Company, a corporation of Ohio Application December 14, 1953, Serial No. 398,126

3 Claims. (Cl. 138—56)

The present invention relates to reinforced flexible conduits for various uses and to the method for the manufacture of same.

In certain of the domestic and industrial arts it has become desirable to employ a fluid impervious hose or conduit which is at once readily flexible and of sufficient radial strength to prevent collapse thereof when the conduit is subjected to severe flexing or radial loads from exterior sources. Where the fluid to be conveyed by said hose moves at a substantial velocity and particularly where such fluid is in a gaseous state, it has been found further desirable that the flexible, radially reinforced conduit have a substantially smooth interior surface so that a minimum of resistance will be offered by the conduit to the free flow of the material therewithin. To provide the desired radial reinforcement and resistance to collapse of the hose, it has been the practice to employ a circumferential reinforcement in the form of coiled wire or fabric wrappings. Where the coiled wire was employed, it proved convenient to enhance the flexibility of the hose or conduit by corrugating the rubber or rubberized fabric body of the same between the turns of the coiled wire. The nature of the wire spring, however, was such that when it was embedded in a rubber body, it would tend to separate therefrom, thereby destroying the desired reinforcing effect and rendering the hose unsuitable for further use. If, on the other hand, as has been the prominent practice prior to this invention, the coiled wire is embedded between layers of fabric to prevent it from cutting through the rubber tube, the hose has suffered for the loss of the desired flexibility.

Other attempts have been made to introduce the coiled wire into a tubular rubber hose body such that the wire lies along the inner surface of the rubber member rather than being embedded therein. This arrangement has proven unsatisfactory, however, in view of the fact that the wire has been exposed to the fluids flowing within the conduit resulting in its corrosion. Furthermore, in order to hold the wire helices in their properly spaced relation, it has been necessary to corrugate the tube along its inner as well as its outer surfaces so as to provide a seating for the wire turns. This corrugation of the interior surface of the tubing has been unsatisfactory in that it has presented an additional form of resistance to the flow of the fluid within the tubing as mentioned above. Attempts have been made to correct this corrugation of the inner surface of the hose by means of positioning the reinforcing member between an inner and an outer tubular rubber body portion or by filling the corrugations of the inner surface with a "dough" of rubber or similar material. The resulting hose has been unsatisfactory, however, insofar as the addition of the rubber in the form of an inner tube or dough has impaired the flexibility of the resulting product and has increased the time consumed in its manufacture.

It is accordingly an object of the present invention to provide a fluid impervious conduit which is at once extremely flexible and reinforced against radial compression and collapse.

It is a further object of the present invention to provide a fluid impervious conduit having a corrugated exterior surface to improve its flexibility and a smooth interior surface such as to allow for the free flow of a fluid therewithin.

It is a further object of the present invention to provide a reinforced flexible conduit such that the reinforcing member will not be subject to corrosion and premature deterioration.

It is a further object of the present invention to provide a method for the manufacture of conduits of the type herein disclosed.

It is yet another object of the present invention to provide a method for the manufacture of the flexible conduit of the type herein disclosed in which it will not be necessary to enhance time of manufacture and material costs by the addition of a fabric reinforcement coextensive with the length of the hose.

It is yet another object of the present invention to provide a method for the manufacture of flexible corrugated tubing which will at once have a smooth interior surface, and will have a reinforcing member completely protected from the corrosive effects of the fluid to be passed within the hose, all of this without the necessity for the incorporation of a second inner tube or liner for the conduit.

To achieve these and other objects and advantages of the present invention which will be apparent from a reading of the following disclosure, it is provided that the hose of this invention be composed of a circumferential reinforcing member, at least the surfaces of which are composed of a flexible organic plastic material and a sheath or tube of a similar material positioned outwardly of said reinforcing member, such that means may be provided for corrugating the outer surface of the final conduit by forcing the tube or sheath inwardly against the reinforcing member and the interior surface of the hose may be made to consist in part of the material of the sheath or tube and in part of the material coating the reinforcing member, all of said parts lying in substantially the same plane longitudinally of the hose such that a substantially cylindrical smooth interior surface is formed. The method for achieving the desired configuration as set forth above comprises positioning the sheath or tube of the flexible organic plastic elastomeric material about the circumferential reinforcing member having a surface of similar material, in such a manner that the reinforcing member has a uniform pitch or pattern longitudinally of the entire conduit. With the sheath and reinforcing member thus positioned, means are provided for forcing the sheath radially inwardly preferably between the spacings of the circumferential reinforcing member, and against a smooth, substantially cylindrical forming surface such that, upon subjection of the assembly thus formed to conditions of heat and/or pressure which will cause the plastic materials of the sheath and the surface of the reinforcing member to flow and to coalesce, an integrated structure will result in which the reinforcing member will be partially embedded in the sheath and the exposed portion thereof will be flattened against said substantially cylindrical forming surface. At the same time, the material of the sheath in contact with such forming surface between the spacings of the circumferential reinforcing member will likewise become flattened against the forming surface.

From a consideration of the above general description of the present invention, it can be seen that its principles may be most advantageously applied to the manufacture of hose having corrugated or convoluted configurations to provide greatest flexibility and circumferential reinforcing members such as spaced rings or coils of strengthening material, each convolution of such coil being spaced from its neighboring convolution. The methods of this present invention are further primarily adapted to the manufacture of hose about a cylindrical mandrel around which the reinforcing member may be positioned and about which the flexible organic plastic sheath may be positioned after which the latter may be forced inwardly against the mandrel between the spaced convolutions of the reinforcing member and the assembly subjected to such conditions as will cause the material both of the sheath and the reinforcing member surfaces to coalesce and flatten out along the mandrel.

With reference to the material to be employed in the present invention, it is to be understood that, under proper conditions of compounding and manufacture, a broad range of materials of a plastic nature such that they may be molded under proper conditions of heat and/or pressure are satisfactory for use. It is preferred, however, that the material also be elastic as well as flexible. To be included in this group of preferred materials are natural rubber, the various synthetic rubber-like compositions such as the polychloroprenes known as neoprene, the butadiene-styrene copolymers known as Buna-S or GR-S, the butadiene-acrylic nitrile copolymers referred to as Buna-N or GR-A, the various polysulphides known as Thiokol, butyl rubber, the various moldable organic thermoplastic materials such as the vinyl copolymers, the cellulose compounds, polyethylene and the like. While the sheath or tubular body portion of the hose will generally be composed primarily of one of these materials, or a mixture or combination of any of them, the reinforcing material may be similarly composed or may comprise a wire or resilient metallic member surrounded by a surface coating of the plastic material.

The above described principles and features of the present invention may be more clearly understood from a reading of the following detailed description in connection with one preferred embodiment employing the same. For the purposes of this description, reference may be had to the appended drawings in which.

Figure 1:
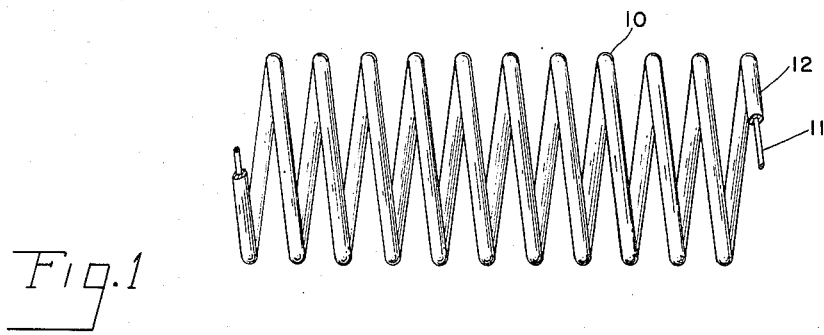
Figure 1 is an elevational view in partial cross-section showing a reinforcing member which may be incorporated in the flexible conduit of the present invention.

In Figure 1 there is shown a circumferential reinforcing member 10 such as may be conveniently employed in the manufacture of flexible tubing according to the present invention. This preferred reinforcing member is in the form of a helix spun from a wire 11 coated uniformly with a flexible organic plastic material 12. While the reinforcing member of Figure 1 is shown to have a core of a material different from that of surface coating, it is to be understood that the entire reinforcing member may be formed from the suitable compound such as the flexible organic plastic material of the surface 12. The advantages of the present invention are derived not from the internal structure of the reinforcing member itself, but from its surface coating material and the moldable plastic properties thereof as will be hereinafter more fully explained.

Figure 2:
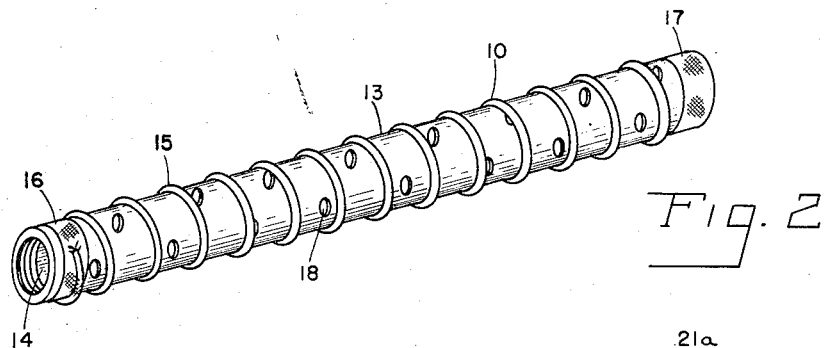
Figure 2 is a view in perspective showing a mandrel suitable for the method of manufacturing hose according to the present invention with a reinforcing member positioned thereon.

In Figure 2 there is shown a mandrel 13 having a hollow interior 14 about which the reinforcing member 10 of Figure 1 may be positioned so that its respective helices or convolutions 15 are in a predetermined desired spacing longitudinally of the mandrel. If desired, fabric end reinforcements may be incorporated in the final hose by placing such reinforcing strips, preferably of rubberized fabric as 16 and 17 at each end of the mandrel either before or after positioning the reinforcing member thereon as shown in Figure 2. The reinforcing member 10 may be held in its desired position upon the mandrel by suitable means such as windings of friction tape about its ends, or the reinforcing member 10 may be such that, when it is in its natural state of repose, its overall length and the pitch of its helices may be entirely satisfactory such that the anchoring of the reinforcing member will not be necessary. The mandrel 13 of Figure 2 is shown to have a plurality of perforations 18 adapting the mandrel to one of the preferred methods of practicing the present invention as will be more fully explained below.

While fabric reinforcements 16 and 17 may be employed at the end of the reinforcing member upon the mandrel, it is to be noted in Figure 2 that additional fabric reinforcement in the form of sheets or strips wound above and/or below the reinforcing member along its entire length are unnecessary, and accordingly the methods of the present invention will provide a more flexible hose.

Figure 3:
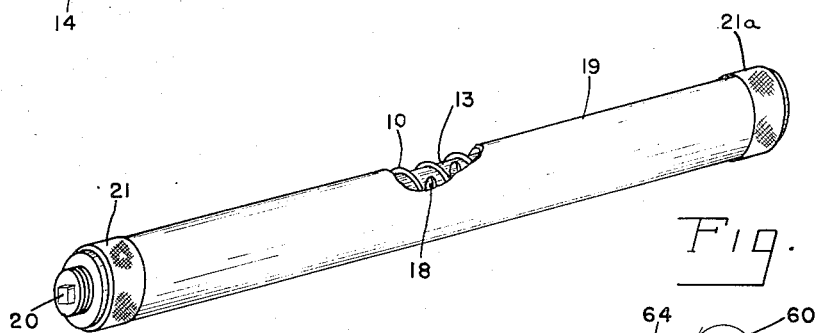
Figure 3 is a view in perspective of a tubular hose member positioned over the assembly of Figure 2, partially broken away to show the reinforcing member and the mandrel.

As shown in Figure 3, about the reinforcing member positioned upon the mandrel is placed a sheath or tube 19 of a flexible, plastic organic material. This sheath 19 should be so positioned that it extends beyond the ends of the reinforcing member and covers all of the perforations 18 of the hollow mandrel 13 so as to enclose the interior thereof from the atmosphere surrounding the same except for the ends thereof which may be capped by a suitable plug such as 20. This tube or sheath 19, composed for example, of a rubber-like material is preferably such that when it is in a state of repose, its inside diameter will be slightly less than the outside diameter of the mandrel, so that, when it is placed about the reinforcing member upon the mandrel, its elastic nature will cause it to draw inwardly thus grasping firmly both the reinforcing member and the mandrel. Depending upon the particular composition of the tube or sheath and that of the coating of the reinforcing member, an adhesive may be desirable between the reinforcing member and the sheath. It has been found that where the surface of the reinforcing member is compatible with the material from which the sheath is formed to the extent that the material of both members will fuse or coalesce, an adhesive may be omitted. The tube or sheath thus mounted about the mandrel and extending beyond the reinforcing member positioned thereon is preferably taped by friction tape or a suitable binder such as shown at 21 and 21a so as to more effectively seal the interior of the mandrel from the surrounding atmosphere.

Figure 4:
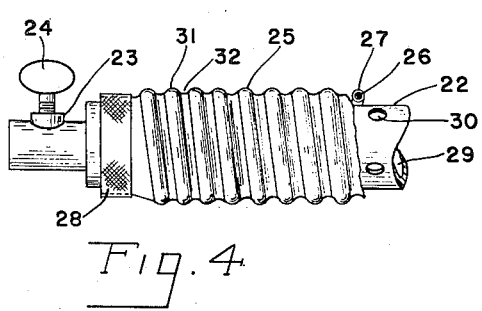
Figure 4 is an elevation of a portion of a mandrel with a portion of a flexible conduit built thereon.

In lieu of the closed end mandrel shown in Figure 3, the hollow mandrel 22 of Figure 4 may be provided with a valve 23 and adjusting stem 24. When a tubular sheet 25 of flexible plastic organic material is placed about a reinforcing member 26 having a surface coating 27 of a similar material and the ends of such sheet extend beyond the reinforcing member and are taped or anchored by an adhesive strip 28, the interior 29 of the hollow mandrel 22 may be sealed at one end (not shown) by means of a valve similar to 23 and 24 or by means of a suitable type plug such as 20 of Figure 2 and the interior of the mandrel may then be partially evacuated by means of a vacuum pump or other evacuating means (not shown). Once a partial vacuum has been drawn on the interior of the mandrel, the valve 23 may be closed so as to preserve the vacuum within the mandrel. As the evacuation of the interior 29 of the mandrel takes place, the pressure of the surrounding atmosphere will be such that it will tend to equalize with that within the mandrel via the perforations 30 thereof such that the tube or sheath 25 will be forced inwardly around the reinforcing member 26 and against the mandrel 22 to provide the alternate raised corrugation 31 and recessed troughs 32.

An alternative method of forcing the rubber sheet around the reinforcing member and against the mandrel to form the corrugations as described in Figure 4 is the well-known procedure of tightly winding a cord or cable about the sheath such as 25 between the turns or helices of the reinforcing member 26 to provide the corrugation similar to that of the hose in Figure 4. In this procedure it is of course not necessary to employ a hollow mandrel.

Once the hose has been built about the mandrel as described in connection with either Figure 3 wherein the sheath is simply extended over the reinforcing member upon the mandrel, Figure 4 wherein a vacuum is drawn within the interior of the hollow mandrel so as to draw the rubber sheath in against the mandrel and around the reinforcing member, or by the well-known method of cording as described above, the hose assembly and the mandrel are placed in a chamber capable of providing the necessary conditions of heat and/or pressure to cause the flexible organic plastic material of the tubular body member and the coating material of the reinforcing member to coalesce and to flow resulting in the integrated structure to be hereinafter more fully described.

Figure 5:
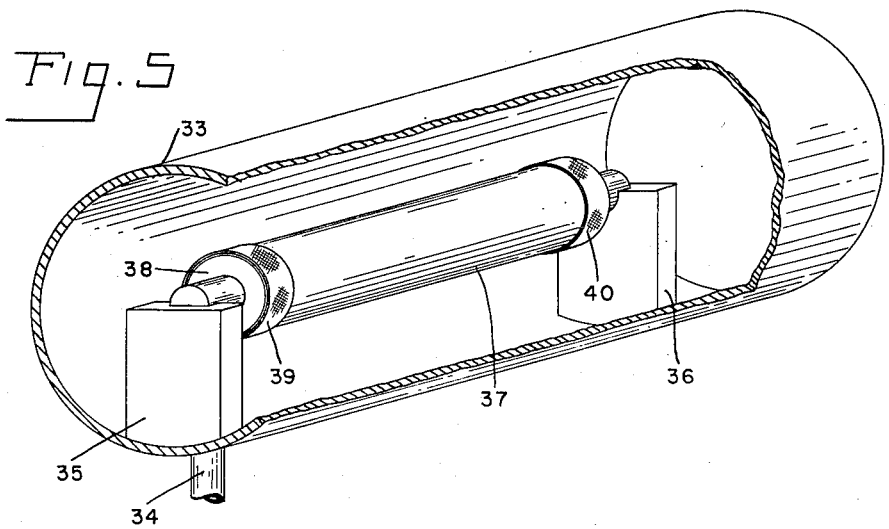
Figure 5 is a perspective showing a curing chamber, partially broken away, in which is positioned a hose built about a mandrel according to the present invention.

Such a curing chamber is shown at 33 in Figure 5 to be provided with inlet and/or outlet means 34 through which heated air or steam under desired pressure conditions may be introduced. Supported within this chamber on suitable supports such as the grooved blocks 35 and 36 may be a mandrel carrying the conduit built up according to any of the methods previously described in connection with Figures 3 and 4.

The hose assembly positioned in the curing chamber 33 and supported by the blocks 35 and 36 may be prepared prior to its positioning in this curing chamber according to the previously described procedure in connection with Figures 2, 3 and 4. The primary objective in this curing phase of the process of manufacturing flexible tubing according to this invention is to cause the rubber sheath such as 37 to surround a reinforcing member so positioned that, upon the application of heat and/or pressure, the material of the sheath and the surface material of the reinforcing member will flow and coalesce forming a substantially unitary structure having a corrugated exterior surface and a flat smooth interior surface. Where, for example, the hollow perforated mandrel is closed at both ends prior to its insertion into the curing chamber as described in connection with Figure 3, an increase of pressure will be necessary in the curing chamber such that the pressure of the atmosphere in the chamber surrounding the tubing built upon the mandrel will be greater than the pressure that was fixed within the interior of the mandrel upon its ends being closed in an atmosphere of a lesser density, and the pressure differential thus resulting will force the rubber sheath 37 inwardly around the turns of the circumferential reinforcing member such that a corrugated exterior surface will be obtained. As a result of this same pressure and the flow of the plastic material forming the sheath and the surfaces of the reinforcing member, the mandrel 38 may be of such dimensions and so positioned that the rubber sheath 37 will also be forced into contact with the smooth and cylindrical surfaces of the same such that the flow of the material of the sheath together with the flow of the surface coating of the reinforcing member will result in a substantially smooth and continuous cylindrical inner surface being imparted to the final tubing.

An alternative means of achieving the pressure differential between the atmosphere surrounding the tubing in the curing chamber and the atmosphere within the interior of the hollow mandrel, the arrangement described in connection with Figure 4 may be employed whereby a vacuum is drawn upon the interior of the hollow mandrel having the tube placed thereon prior to the placing of the same in the curing chamber. While the drawing of the atmosphere from the interior of the mandrel may be continued while the tubing is being cured in the curing chamber, it is much simpler and ordinarily quite satisfactory to seal the interior of the mandrel by convenient means such as the valves 23 and 24 of Figure 4 after the vacuum has been established and then placing the mandrel thus sealed in the curing chamber. As described above, the tube is long enough to cover the perforations of the mandrel and its ends are preferably wrapped with tape such as 39 and 40 to complete the sealing of the mandrel interior. In lieu of either of the above described methods for creating a pressure differential to effect corrugation of the exterior of the tubing, a solid or nonperforated mandrel may be employed and the sheath forced its corrugated configuration by means of cording in the conventional manner as previously described.

Figure 6:
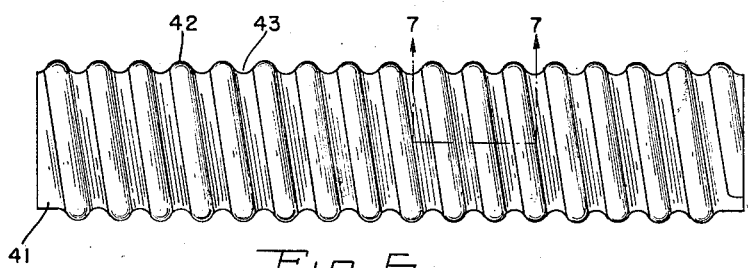
Figure 6 is an elevation of the finished corrugated hose or conduit according to the present invention.
Figure 7:
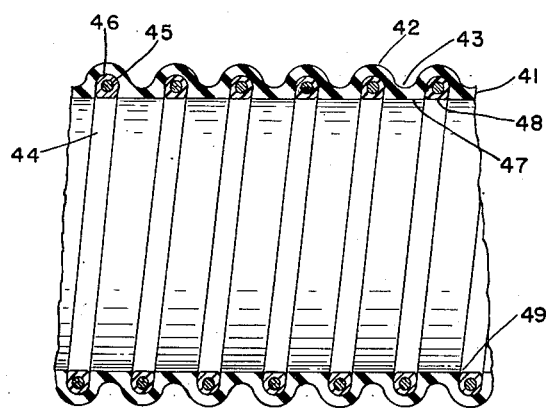
Figure 7 is a transverse vertical cross-section on line 7—7 of Figure 6.

The hose resulting from the practicing of the above described method is shown in Figures 6 and 7 wherein the sheath or seamless tube 41 is shown to have the desired corrugated exterior surface of alternating crests 42 and troughs 43 enhancing the flexibility of finished hose. Extending circumferentially of the tube throughout the length and near the interior surface thereof is the reinforcing member 44 comprising a helically wound wire 45 surrounded by a coating 46. As previously explained, the coating material of wire will be similar to that of the sheath 41 such that the same may to a certain extent be considered compatible.

A typical wire coating compound might be as follows:

| | Parts by weight |
|---|---|
| Polyvinyl chloride resin | 100 |
| Stabilizer (e. g., lead stearate) | 2 |
| Softener (e. g., dibutyl phthalate) | 30 |
| Wax lubricant | 1 |

A typical tube compound for use with the above wire coating compound might be as follows:

| | Parts by weight |
|---|---|
| Butadiene-acrylonitrile copolymer | 95 |
| Polyvinyl chloride | 55 |
| Filler (e. g., hydrated silicon dioxide) | 20 |
| Plasticizer (e. g., dibutyl phthalate) | 10 |
| Sulfur | 1.5 |
| Accelerator (e. g., benzothiazyl disulfide) | 1.5 |

Figure 8:
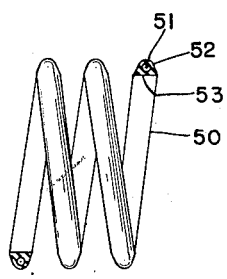
Figure 8 is a view in elevation of a reinforcing member having a modified surface coating.

During the vulcanization of the tubing and the surface coating of the reinforcing member, the plastic materials of these components will flow with the result that the interior surface of the conduit will become flattened against the mandrel and will consist in part of segments of the sheath 47 and in part of segments of the flattened coating material of the reinforcing members as at 48. When the compounds set forth in the above examples are employed, the desired flow, coalescence and setting may be achieved by subjecting the assembled hose to steam at 60 to 70 p. s. i. in a vulcanizer. While sufficient material to completely fill the openings normally left between the reinforcing member and the sheath upon the interior surface of the tube as at 49 may be employed, it is usually not necessary that such a large amount of elastic plastic material be used insofar as the segments 47 and 48 will be flat and substantially in the same plane. The occasional grooves as shown at 49 resulting from the lack of the necessary materials to fill such gaps will not interfere with the free flow of a fluid within the conduit once it has been constructed and put into use. Where it is desired that no grooves or voids such as 49 mar the interior surface of the tube, a completely smooth and flat surface may be insured by employing a reinforcing member such as 50 of Figure 8 wherein the coating of the wire 51 forms a triangular cross section such that the bottom surface 53 of the coating 52 of the reinforcing member as it is preformed, usually by extrusion, will be flat.

Figure 9:
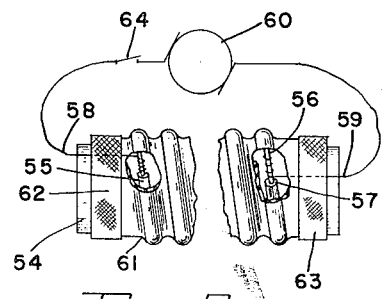
Figure 9 is a diagrammatic illustration of an alternative method for manufacturing hose of this invention.

In lieu of the curing chamber of Figure 5, a hose, built upon a mandrel and having its exterior surface corrugated by forcing the hose body inwardly between the turns of the reinforcing member according to the above described variants of the present invention, may be finally formed as shown in Figure 9. About the mandrel 54 is positioned a circumferential reinforcing member 55 comprising a wire helix 56 coated with a flexible organic plastic elastomeric surface 57. At each end of the wire helix are fastened electrical lead wires 58 and 59 which are connected to a source of electrical energy, preferably an alternating current generator 60. About the reinforcing member 55 thus connected and positioned is placed the tubular hose body 61 of a plastic material similar to that of the wire coating 57. The tube is then forced inwardly against the mandrel between the spaced helices of the reinforcing member by any of the above described methods and anchored at its ends by tape windings 62 and 63. While the tube is thus held in position with its exterior surface corrugated and its interior tight against the mandrel, the alternating current is passed through the reinforcing wire 56 by closing switch 64 and the heat created by the passage of this current will cause the curing and coalescence of the plastic materials of the wire coating and the tube resulting in a hose similar to that of Figures 6 and 7.

The flexibility of a hose built according to any of the above described methods may be enhanced according to the additional step of longitudinally compressing the hose after it has been initially corrugated and at least partially cured or vulcanized. This longitudinal compression forces the corrugations into closer relation and, at the same time, causes the diameter of the convolutions of the reinforcing member to increase such that deeper corrugations may be provided. The hose in this axially compressed state is subjected to further heating such that the advantages gained from this compression may be permanently established. While this method results in a hose of improved flexibility, and while the interior of the same after reheating during the longitudinal compression of the same is smooth and continuous, the increase in the diameter of the reinforcing member often tends to cause that part of the surface material coating this reinforcing member which would form a part of the interior surface of the hose to be of a greater diameter than those parts of the inner hose surface formed by the outer rubber sheath itself such that a truly cylindrical interior surface is not achieved. The fact that while not truly cylindrical, the interior surface of the hose thus formed is substantially smooth and continuous and does not therefore interfere excessively with the flow of a fluid within the hose, is often outweighed in practical considerations wherein improved flexibility beyond that provided by the basic principles of this invention is desired.

While the present invention has been described in connection with a preferred embodiment of the same and the methods for the practicing thereof with certain variations and modifications, it is to be understood that all references to particulars in the foregoing description were for purposes of illustration only and in no way limit the scope of this invention as more particularly defined in the subjoining claims.

We claim:

1. A flexible conduit having a corrugated exterior surface and a substantially smooth cylindrical interior surface comprising a coiled reinforcing member having spaced convolutions, said member comprising a spring wire surrounded by a surface layer of organic plastic material formed with a substantially smooth flattened area over the innermost surfaces thereof concentric with the interior surface of said conduit, an externally corrugated tubular layer of a flexible organic plastic material engaging and partially surrounding the convolutions of said coiled reinforcing member and being bonded to said surface layer, said tubular layer surrounding and being bonded to substantially the entire surface of each of said convolutions except for said flattened areas and extending between each convolution and being formed with smooth and flattened interior surfaces therebetween coextensive with the flattened areas of said convolutions, whereby the cylindrical interior surface area of said conduit is defined by the flattened interior surfaces of said convolutions and the flattened interior surface areas of said tubular layer.

2. A flexible conduit according to claim 1 wherein the tubular layer and the surface layer are composed of thermoplastic material.

3. A flexible conduit according to claim 2 wherein the thermoplastic tubular layer and the surface layer comprises polyvinyl chloride.

References Cited in the file of this patent

UNITED STATES PATENTS

| | | |
|---|---|---|
| 489,478 | Hopkinson | Jan. 10, 1893 |
| 1,599,905 | Loughead | Sept. 14, 1926 |
| 1,810,032 | Schulthess | June 16, 1931 |
| 2,245,758 | Chernak | June 17, 1941 |
| 2,384,547 | Fryling | Sept. 11, 1945 |
| 2,516,864 | Gilmore et al. | Aug. 1, 1950 |
| 2,550,099 | Vance | Apr. 24, 1951 |
| 2,560,369 | Roberts | July 10, 1951 |
| 2,568,848 | Ebabnit | Sept. 25, 1951 |
| 2,570,259 | McKinley | Oct. 9, 1951 |
| 2,641,302 | Martin et al. | June 9, 1953 |
| 2,645,249 | Davis et al. | July 14, 1953 |
| 2,661,026 | Schulthess | Dec. 1, 1953 |
| 2,674,297 | Greenwald | Apr. 6, 1954 |

FOREIGN PATENTS

| | | |
|---|---|---|
| 14,850 | Great Britain | of 1884 |
| 869,299 | France | Nov. 7, 1941 |
| 588,858 | Great Britain | June 4, 1947 |
| 627,201 | Great Britain | Aug. 2, 1949 |
| 651,097 | Great Britain | Mar. 14, 1951 |
| 986,095 | France | Mar. 21, 1951 |